US012323039B2

(12) United States Patent
Shirazee

(10) Patent No.: US 12,323,039 B2
(45) Date of Patent: Jun. 3, 2025

(54) AIR COOLING OF AN INTERNAL COMBUSTION ENGINE WITH AN ELECTRICAL MOTOR OR GENERATOR

(71) Applicant: EPROPELLED LIMITED, Cardiff South Glamorgan (GB)

(72) Inventor: Nabeel Ahmed Shirazee, Cardiff South Glamorgan (GB)

(73) Assignee: EPROPELLED LIMITED, Cardiff South Glamorgan (GB)

( * ) Notice: Subject to any disclaimer, the term of this patent is extended or adjusted under 35 U.S.C. 154(b) by 880 days.

(21) Appl. No.: 17/613,036

(22) PCT Filed: May 20, 2019

(86) PCT No.: PCT/GB2019/051385
§ 371 (c)(1),
(2) Date: Nov. 19, 2021

(87) PCT Pub. No.: WO2019/220149
PCT Pub. Date: Nov. 21, 2019

(65) Prior Publication Data
US 2022/0224199 A1    Jul. 14, 2022

(30) Foreign Application Priority Data

May 18, 2018    (GB) .................................... 1808132

(51) Int. Cl.
*H02K 9/06*        (2006.01)
*H02K 1/16*        (2006.01)
(Continued)

(52) U.S. Cl.
CPC ................. *H02K 9/06* (2013.01); *H02K 1/16* (2013.01); *H02K 1/2789* (2022.01);
(Continued)

(58) Field of Classification Search
CPC .......... H02K 9/06; H02K 9/227; H02K 5/207; H02K 1/2791
See application file for complete search history.

(56) References Cited

U.S. PATENT DOCUMENTS

2002/0145348 A1*  10/2002  Anma ................... H02K 1/2791
                                                              310/91
2006/0091761 A1*  5/2006  Lafontaine ............... H02K 1/30
                                                              310/90
(Continued)

FOREIGN PATENT DOCUMENTS

CN    1663098 A     8/2005
CN    1685589 A    10/2005
(Continued)

OTHER PUBLICATIONS

European Patent Office, "Notification of Transmittal of the ISR and the Written Opinion of the International Searching Authority, or the Declaration," in PCT Application No. PCT/GB2019/051385, dated Jul. 9, 2019, 17 pages.
(Continued)

*Primary Examiner* — Tran N Nguyen
*Assistant Examiner* — Masoud Vaziri
(74) *Attorney, Agent, or Firm* — Studebaker Brackett PLLC

(57) ABSTRACT

An electrical machine comprises a stator (11) having a plurality of windings (25) and a rotor (19) having a plurality of permanent magnets (26) arranged to rotate around the windings (25), the magnets (25) being mounted to an outer portion (23) of a rotor body (20), the rotor body (20) further having an inner hub portion (21) and a plurality of circumferentially-spaced arms (22) which extend radially from the hub portion (21) to the outer portion (23) of the body (20), at least one of the arms (22) comprising a vane (24) which causes an axial airflow as the rotor rotates. The axial airflow
(Continued)

flows over the windings (25) and helps to prevent overheating without the need for any additional cooling. Since the cooling is conveniently provided by part of the rotor, the machine the machine is simple and compact.

12 Claims, 6 Drawing Sheets

(51) Int. Cl.
    *H02K 1/2789*     (2022.01)
    *H02K 1/2791*     (2022.01)
    *H02K 5/20*     (2006.01)
    *H02K 9/22*     (2006.01)

(52) U.S. Cl.
    CPC ........... *H02K 1/2791* (2022.01); *H02K 5/207* (2021.01); *H02K 9/227* (2021.01)

(56) References Cited

U.S. PATENT DOCUMENTS

| | | |
|---|---|---|
| 2006/0250034 A1 | 11/2006 | Umezu |
| 2010/0133927 A1 | 6/2010 | Zhang |
| 2010/0231079 A1* | 9/2010 | Abe ..................... H02K 21/24 |
| | | 310/156.35 |
| 2012/0262021 A1* | 10/2012 | Lafontaine ............. H02K 21/22 |
| | | 310/156.08 |
| 2018/0109164 A1 | 4/2018 | Holman |
| 2018/0370642 A1* | 12/2018 | Imaizumi ............... H02K 11/27 |

FOREIGN PATENT DOCUMENTS

| | | |
|---|---|---|
| CN | 1833345 A | 9/2006 |
| CN | 101696675 A | 4/2010 |
| CN | 101752920 A | 6/2010 |
| CN | 102570719 A | 7/2012 |
| CN | 104295529 A | 1/2015 |
| CN | 104967260 A | 10/2015 |
| CN | 206180776 U | 5/2017 |
| EP | 0 645 542 A1 | 3/1995 |
| JP | 2000270517 | 9/2000 |

OTHER PUBLICATIONS

The International Bureau of WIPO, "Notification concerning Transmittal of International Preliminary Report on Patentability", in PCT Application No. PCT/GB2019/051385, dated Dec. 2, 2021, 10 pages.

An Office Action mailed by China National Intellectual Property Administration on Jun. 21, 2023, which corresponds to Chinese Patent Application No. 201980096546.2 and is related to U.S. Appl. No. 17/613,036; with English language translation.

* cited by examiner

AIR COOLING OF AN INTERNAL COMBUSTION ENGINE WITH AN ELECTRICAL MOTOR OR GENERATOR

BACKGROUND OF THE INVENTION

(1) Field of the Invention

This invention relates to an electrical machine such as a motor or generator and more particularly but not solely to an electrical generator for an unmanned aerial vehicle.

(2) Description of Related Art Including Information Disclosed Under 37 CFR 1.97 and 1.98

Unmanned aerial vehicles or so-called UAVs are lightweight and can travel substantial distances. UAVs generally comprise a small and lightweight internal combustion engine which has the ability to start and stop in flight. In order to achieve this and to provide electrical power to components of the UAV, the internal combustion engine is typically coupled to an electrical generator which charges a battery that can power a starter motor and other electrical components of the UAV. In some cases, the starter motor also acts as the electrical generator.

Most failures of electric generators and motors are attributed to overheating issues. Therefore, it is well known that cooling of an electric generator or motor is an essential part of the design of the machine. The components of the machine that produce the most heat are the windings, the electrical steel laminations, other conductors and sometimes magnets (due to eddy current losses). Therefore, maintaining the recommended operational temperatures of components in the prescribed ambient environment is an essential part of the design.

Normally, the cooling of an electric machine is carried out via the machine casing or housing. Heat from the components, like the winding mostly escape via conduction and radiation into the casing or housing. At the casing or housing, the heat is dissipated via its outer surface fins or liquid cooling pipes. Heat at the surface of the casing can also be dissipated using an external fan or fan mounted on the shaft of the electric machine. A problem with an external fan mounted on the shaft is that it occupies a large amount of space. This is not a problem where size and weight of the electric machine is irrelevant. However, in applications such as UAVs, where size and weight are crucial, an innovative way of cooling is needed.

BRIEF SUMMARY OF THE INVENTION

Thus, in accordance with the present invention, there is provided an electrical machine comprising a stator having a plurality of windings and a rotor having a plurality of permanent magnets arranged to rotate around the windings, wherein the magnets are mounted to an outer portion of a rotor body, the rotor body further having an inner hub portion and a plurality of circumferentially-spaced arms which extend radially from the hub portion to the outer portion of the body, at least one of the arms comprising a vane which causes an axial airflow as the rotor rotates.

In use, the axial airflow flows over the windings and helps to prevent overheating without the need for any additional cooling. Since the cooling is conveniently provided by part of the rotor, the size of the machine is no greater than conventional machines.

The outer portion of the rotor body may be annular such that it surrounds the stator, the plurality of circumferentially-spaced arms extending radially from the hub portion to one end of the annular outer portion of the body. The rotor body thus forms an enclosure around the outside and one end of the stator.

Each arm may comprise a vane to increase the airflow.

The vane may extend substantially the full radial length of the arm.

Each vane may direct air towards the windings as the rotor is rotated in a normal direction of rotation.

The pitch of the at least one vane may be adjustable. The at least one vane may be removable or replaceable.

The stator may comprise a plurality of radially-extending coils, each coil extending around a core of magnetisable material which extends radially from a yoke.

The cores and yoke may be formed by laminated magnetisable members of an identical shape.

The yoke may be annular, a heatsink being disposed inside the yoke and thermally connected thereto, the at least one vane being arranged to cause an airflow over the heatsink. Airflow passageways may extend between the heatsink and the yoke. The heatsink may be annular and the hub portion of the rotor body may extend into the centre of the heatsink, the hub portion being arranged to connect to a rotary shaft which either rotates the rotor (in the case of a generator) or which is rotated by the rotor (in the case of a motor).

The heatsink may be annular and the hub portion of the rotor body may extend into a hollow centre of the heatsink.

The hub portion of the rotor body may be rotatably mounted to the heatsink by a bearing. The heatsink also serves to dissipate heat from the bearing.

Also in accordance with the present invention, there is provided an assembly comprising an internal combustion engine having a body, a rotary shaft extending from the body and an electrical machine as hereinbefore defined, the stator being fixed relative to the engine body and the rotor being mounted on the shaft.

The at least one vane may be arranged to direct air towards the internal combustion engine, thereby ensuring that hot air from air from around the internal combustion engine is not directed at the stator.

The stator may be mounted between the internal combustion engine and the circumferentially-spaced arms of the hub portion.

Since the stator and rotor are respectively mounted to the engine body and the engine shaft, being components of the engine which are spatially fixed relative to each other, it is possible to omit the bearing by mounting the stator to the engine body and by mounting the rotor to the engine shaft.

BRIEF DESCRIPTION OF THE SEVERAL VIEWS OF THE DRAWINGS

Embodiments of the present invention will now be described by way of examples only and with reference to the accompanying drawings, in which.

DETAILED DESCRIPTION OF THE INVENTION

Figure 1:
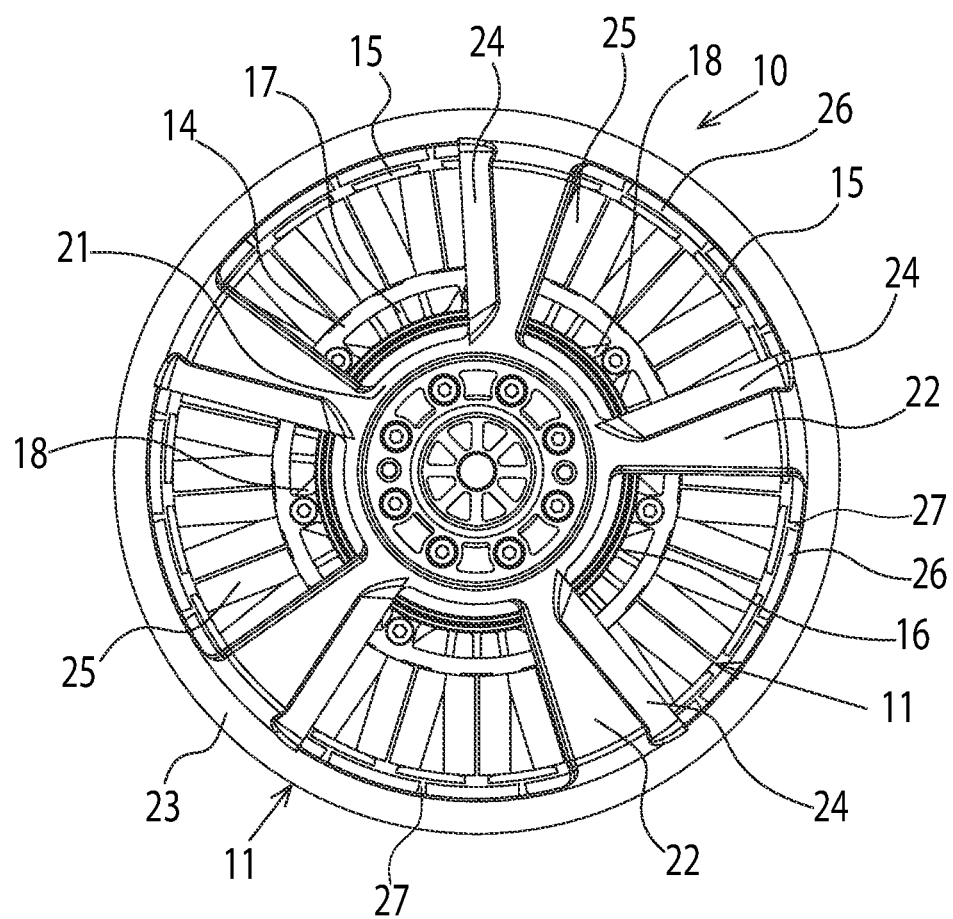
FIG. 1 is a front view of an embodiment of electrical generator in accordance with a first aspect of the present invention.
Figure 2:
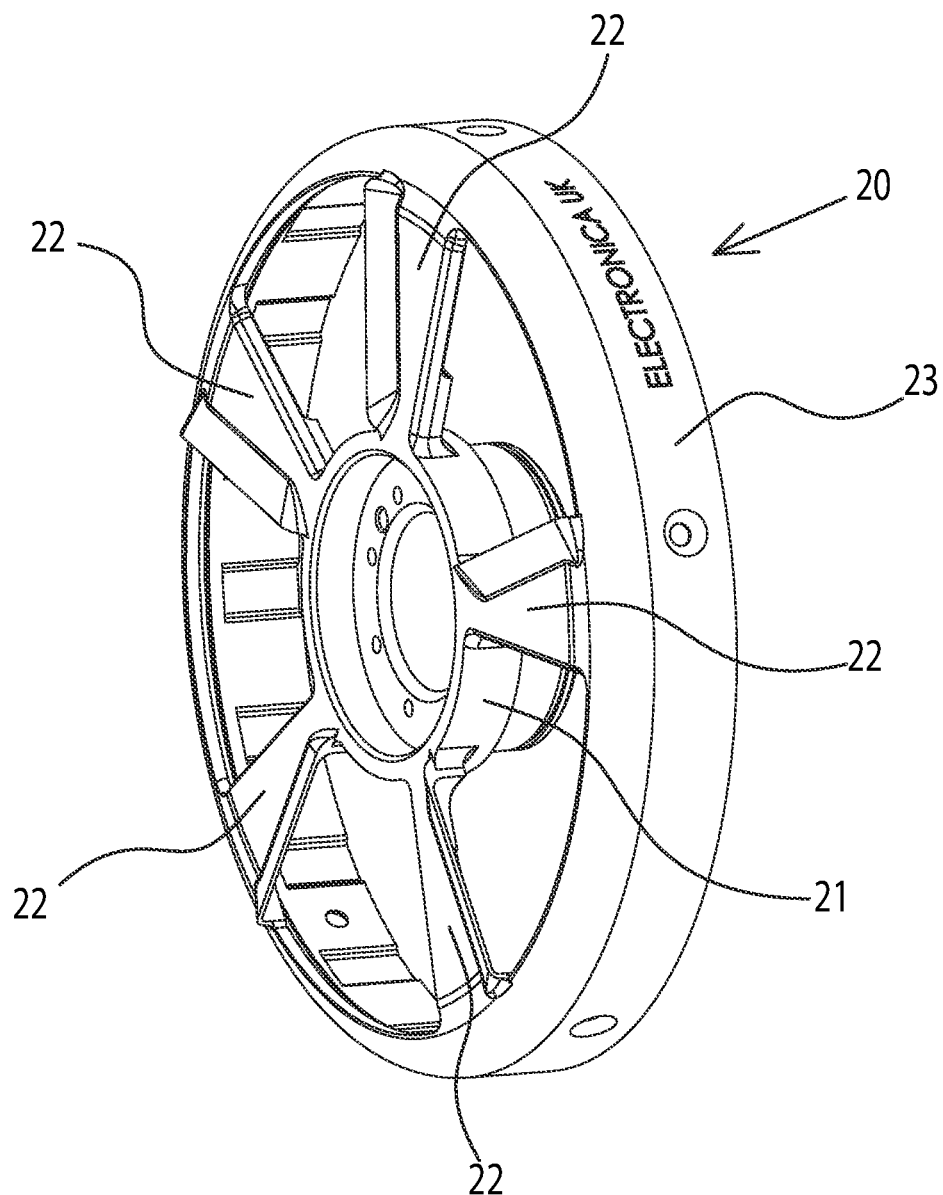
FIG. 2 is a perspective view from the front and the right side of a rotor of the electrical generator of FIG. 1.
Figure 3:
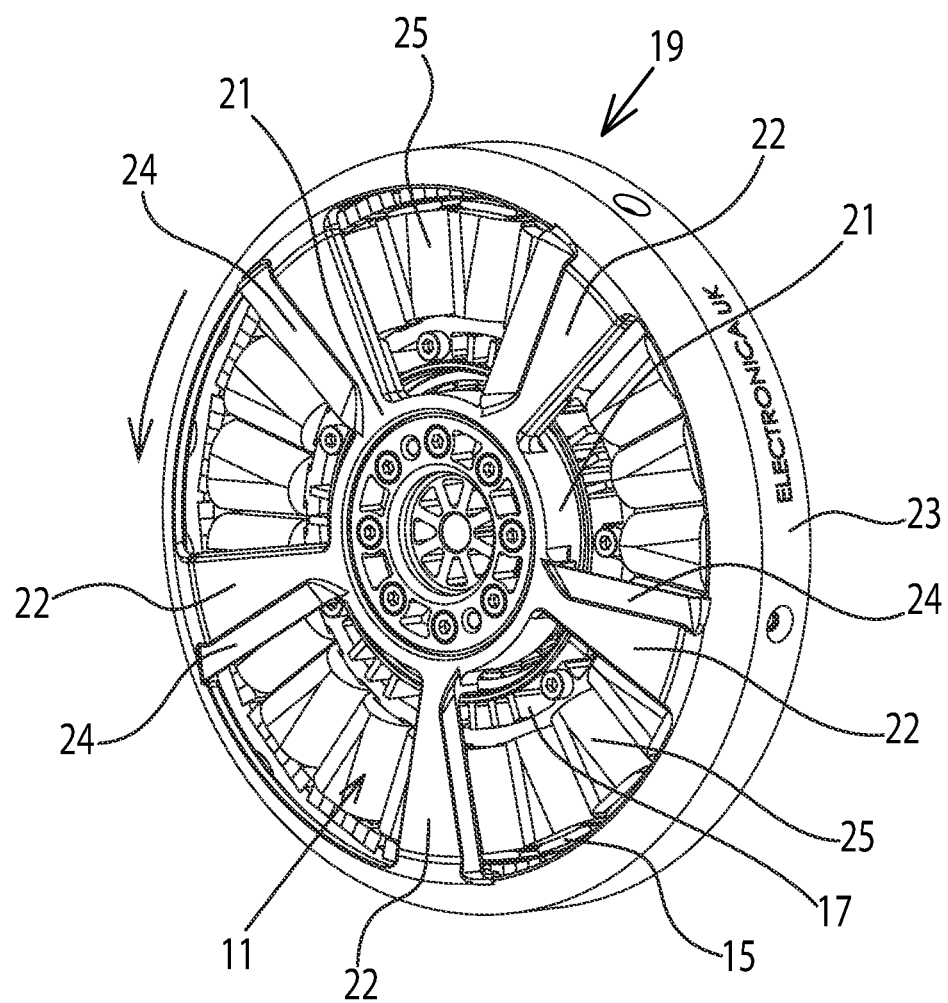
FIG. 3 is a perspective view from the front and the right side of the electrical generator of FIG. 1.
Figure 4:
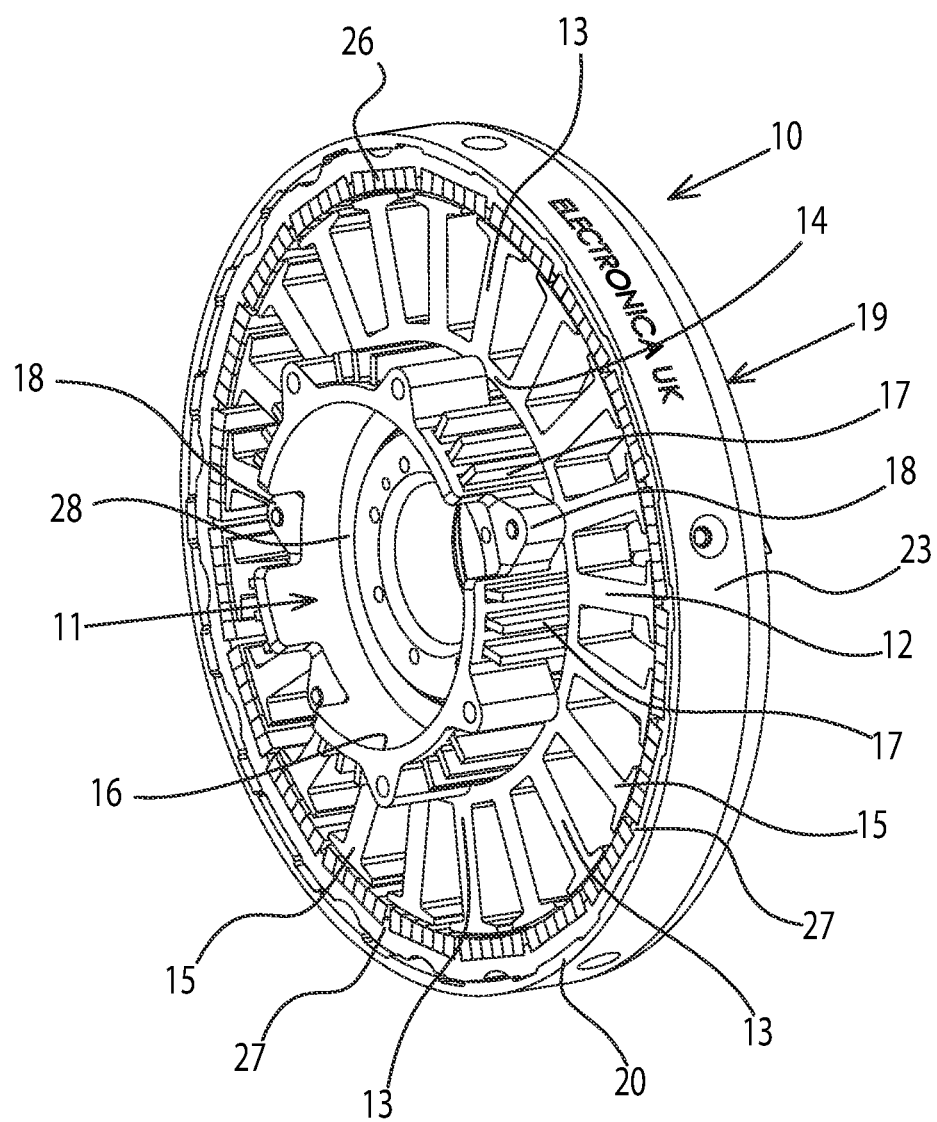
FIG. 4 is a perspective view from the rear and the left side of the electrical generator of FIG. 1, when the coil windings are not fitted.
Figure 5:
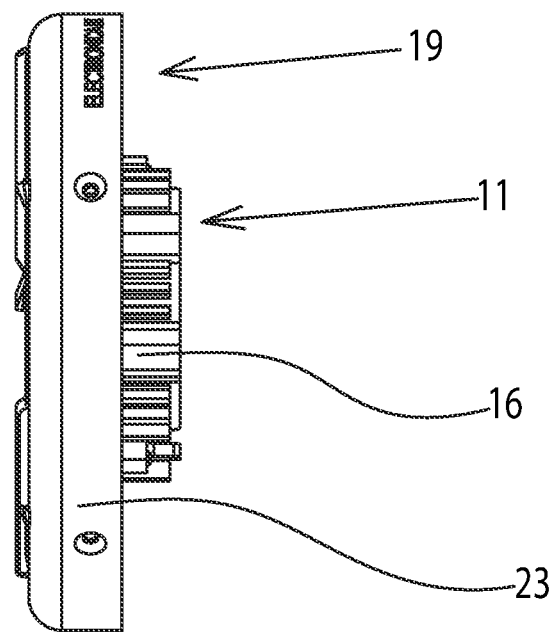
FIG. 5 is a right-side view of the electrical generator of FIG. 1.
Figure 6:
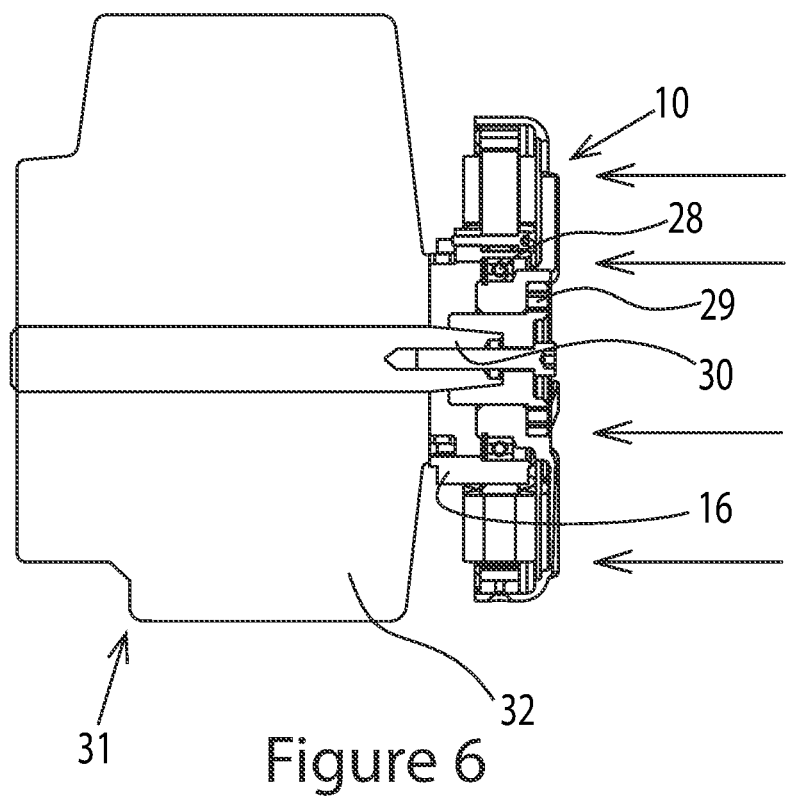
FIG. 6 is a sectional view through an assembly in accordance with the first aspect of the present invention comprising an internal combustion engine and the electrical generator of FIG. 1 fitted thereto.

Referring to the FIGS. 1 to 6 of the drawings, there is shown an embodiment of electrical generator 10 comprising a stator 11 having a laminated stator body 12. The stator body 12 comprises plurality of circumferentially-spaced finger portions 13 which extend radially outwardly from an annular yoke portion 14. The stator body 12 is formed of identically-shaped one-piece sheets of ferromagnetic material, which are mounted together in a stack that extends axially of the stator 11.

A coil winding 25 is disposed around each of the fingers 13. The outer ends of each finger 13 comprise an enlarged head forming respective stator teeth 15. An annular heatsink 16 is disposed inside the yoke 14 of the laminated stator body 12 and comprises fins 17 which extend radially outwardly and which contact the radially inner face of the yoke 14. The heatsink 16 also comprises apertured lugs 18 which extend radially outwardly and which are bolted to the axially inner face of the yoke 14 of the laminated stator body 12.

The electrical generator 10 further comprises a rotor 19 having a one-piece rotor body 20 of aluminium. The rotor body 20 comprises an annular central hub portion 21 and a plurality of circumferentially-spaced arms 22 which extend radially from the hub portion 21 to an annular outer portion 23 of the rotor body 20. The annular outer portion 23 of the rotor body 20 circumferentially surrounds the stator 11 and the plurality of circumferentially-spaced arms 22 connect to the annular outer portion 23 at one axial end thereof, so that the rotor body 20 forms an enclosure around the outside and front face of the stator 11. A plurality of permanent magnets 26 are disposed around the radially inner face of the annular outer portion 23 of the rotor body 20. The permanent magnets 26 are circumferentially spaced from each other by a slot 27. A radial gap of approximately 0.8 mm is provided between the radially outer ends of the stator teeth 15 and the radially inner face of the rotor magnets 26.

In accordance with the first aspect of the present invention, each radially-extending arm 22 of the rotor body 20 comprises a vane 24 which extends substantially the full radial length of the arm 22. A bearing 28 is disposed between the radially outer surface of the hub portion 21 of the rotor body 20 and the radially inner surface of the annular heatsink 16 of the stator 11. A boss 29 is disposed inside the hub portion 21 of the rotor body 20 for mounting the rotor 19 to the shaft 30 of an internal combustion engine 31. The heatsink 16 of the stator 11 is mounted to the front of a body 32 of the internal combustion engine 31.

In use, the internal combustion engine 31 turns the rotor 19 in the counter-clockwise direction, so that the vanes 24 force air rearwardly through the stator 11 towards the internal combustion engine 31. The airflow cools the coils 25 and also flows between the fins 17 of the heatsink 16 to dissipate heat from the heatsink and the stator body 12.

Figure 7:
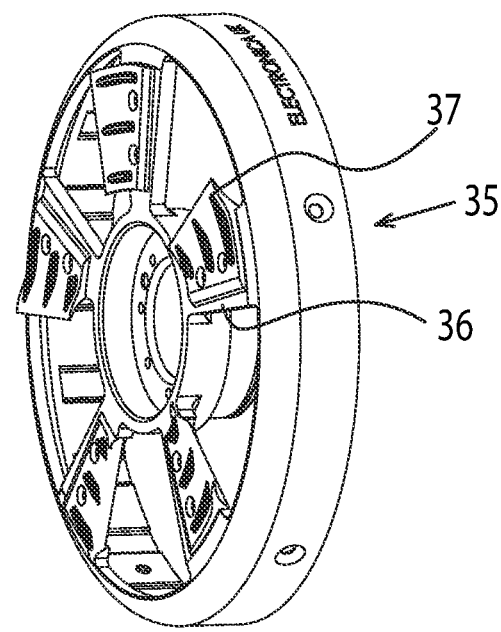
FIG. 7 is a perspective view from the front and the right side of a rotor of an alternative embodiment of electrical generator in accordance with the first aspect of the present invention.

Referring to FIG. 7 of the drawings, there is shown the rotor body 35 of an alternative embodiment of electrical generator, which is similar in construction to the rotor body 20 of the electrical generator 10 of FIGS. 1 to 6. In this embodiment, separate vane members 37 are fitted to each of the radially-extending arms 36 by means of bolts: this allows the vane members 37 to removed, replaced or changed for vane members having a different vane angle.

Figure 8:
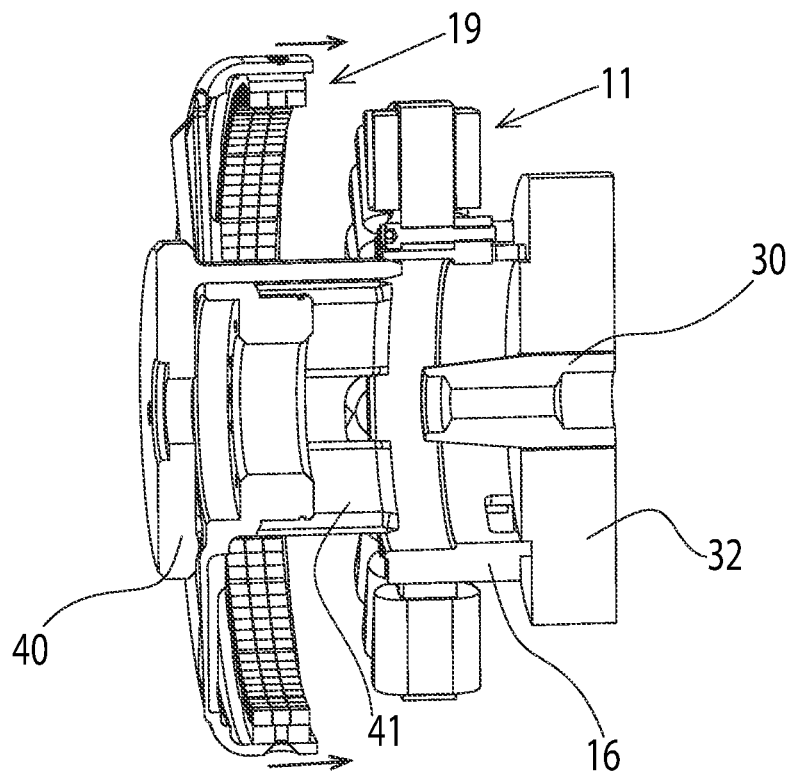
FIG. 8 is a sectional view illustrating the method in accordance with the second aspect of the invention of mounting the electrical generator of FIG. 1 to an internal combustion engine.

Since the stator 11 and rotor 19 are respectively mounted to the engine body 31 and the engine shaft 30, it will be appreciated that it is possible to omit the bearing 28. Thus, referring to FIG. 8 of the drawings, the heatsink 16 of the stator 11 is securely bolted to the body 32 of the internal combustion engine. The rotor 19 is then slid axially onto the axially-extending fingers 41 of a cylindrical mounting tool 40. The distal ends of the fingers 41 are then engaged with the heatsink 16 of the stator 11 and the rotor 19 is then displaced axially along the tool into engagement with the shaft 30. The rotor 19 is then secured to the shaft 30 and the tool 40 is removed.

The use of the tool 40 ensures that a sufficient gap of e.g. 0.8 mm is provided between the rotor 19 and the stator 11 to ensure free rotational movement of the rotor 19 relative to the stator 11.

It will be appreciated that the present invention may be used for motors, generators, combined motors and generators or an electrical machine of any type. The vane profiles either pushes or draws air through the gaps in between the stator components. This happens when the rotor is normally rotating and results in the air being blown on to the components and can be in any direction.

The invention claimed is:

1. An electrical machine comprising a stator having a plurality of windings and a rotor having a plurality of permanent magnets arranged to rotate around the windings, wherein the magnets are mounted to an outer portion of a rotor body, the rotor body further having an inner hub portion and a plurality of circumferentially-spaced arms which extend radially from the hub portion to the outer portion of the body, at least one of the arms comprising a vane which causes an axial airflow as the rotor rotates, wherein the at least one vane is removable or replaceable, the stator comprising a plurality of radially-extending coils, each coil extending around a core of magnetisable material which extends radially from an annular yoke, an annular heatsink being disposed inside the yoke, the heatsink comprising fins which extend radially outwardly to contact and thermally connect with a radially inner face of the annular yoke in which the heatsink is disposed, the at least one vane being arranged to cause an airflow over the heatsink along passageways defined by the fins which extend between the heatsink and the yoke.

2. The electrical machine as claimed in claim 1, in which the outer portion of the rotor body is annular such that it surrounds the stator, the plurality of circumferentially-spaced arms extending radially from the hub portion to one end of the annular outer portion of the rotor body.

3. The electrical machine as claimed in claim 1, in which the outer portion of the rotor body forms an enclosure which extends around the outside and one end of the stator.

4. The electrical machine as claimed in claim 1, in which each arm comprises a said vane.

5. The electrical machine as claimed in claim 1, in which the at least one vane extends substantially the full radial length of the arm on which it is provided.

6. The electrical machine as claimed in claim 1, in which the pitch of at least one vane is adjustable.

7. The electrical machine as claimed in claim 1, in which the cores and yoke are formed by laminated magnetisable members of an identical shape.

8. The electrical machine as claimed in claim 1, in which the hub portion of the rotor body extends into the centre of the heatsink, the hub portion being arranged to connect to a rotary shaft.

9. The electrical machine as claimed in claim 1, in which the hub portion of the rotor body may be rotatably mounted to the heatsink by a bearing.

10. An assembly comprising an internal combustion engine having a body, a rotary shaft extending from the body and the electrical machine as claimed in claim 1, the stator of the electrical machine being fixed relative to the body of the internal combustion engine and the rotor of the electrical machine being mounted on the rotary shaft of the internal combustion engine.

11. The assembly as claimed in claim 10, in which the at least one vane of the electrical machine is arranged to direct air towards the internal combustion engine.

12. The assembly as claimed in claim 10, in which the stator of the electrical machine is mounted between the internal combustion engine and the circumferentially-spaced arms of the hub portion of the electrical machine.

* * * * *